April 9, 1968 — H. R. SAUNDERS — 3,377,082
PASSENGER PROTECTIVE DEVICE
Filed Oct. 22, 1965

INVENTOR
HARVEY R. SAUNDERS
BY
Bertram Frank
ATTORNEY

United States Patent Office 3,377,082
Patented Apr. 9, 1968

3,377,082
PASSENGER PROTECTIVE DEVICE
Harvey Ronald Saunders, 412 Sinclair St.,
Norfolk, Va. 23505
Filed Oct. 22, 1965, Ser. No. 502,217
5 Claims. (Cl. 280—150)

ABSTRACT OF THE DISCLOSURE

The present invention relates to a passenger protective device which comprises a barrier plate. The barrier plate is in the form of a contoured, enclosed shell within which a passenger or driver may be seated. The barrier plate is disposed on the seat of the automobile and is held thereon by means of attachments. Within the barrier plate a cushioning means is provided on the front wall and padding is provided on the seating portion thereof for the comfort of the passenger. A barrier door is provided to work in conjunction with the door on the vehicle to permit entrance and exit into the barrier plate.

This invention relates to a protective device for an occupant of a vehicle. More particularly, it relates to a barrier for the protection of an operator or passenger of the vehicle during a period of rapid deceleration especially that caused by a collision. The barrier may be mounted for use by an operator of an automobile so as to include the operational devices and instruments. The barrier may also be mounted for use by passenger or passengers of vehicles such as trains, airplanes, buses and automobiles, both military and civilian.

The barrier has means to act during a high degree of deceleration of a vehicle, particularly, the quick deceleration caused by a collision or extreme braking, to cushion an occupant when he is propelled against it by momentum. The barrier also confines the occupant to prevent the momentum from throwing him against rigid portions of the vehicle and the like. The barrier provides a shielding against flying objects, such as glass, during a collision.

Conventional auto safety belts and the like give only limited protection since they do not prevent the upper part of the body from going forward and thereby cause "whiplash" injuries to the neck or does not protect the individual from flying objects. Crash helmets that are commonly used by racing car drivers are too confining and not comfortable to be worn for long periods of time. Barriers formed by a multiplicity of plates, belts and cushions are too costly and cumbersome.

Accordingly, it is the general object of this invention to provide a new and improved vehicle safety barrier.

It is a more particular object of this invention to provide a capsule-like safety barrier that is mounted in a vehicle to cushion an occupant during a collision and to protect him after the collision impact from flying objects.

Another object of the invention is to provide a low cost cushioning vehicle safety barrier that may provide easy access into the barrier and exit in an emergency.

A further object is to provide a cushioning vehicle safety barrier that will provide the occupant with comfort and visibility while giving protection.

Another object is to provide the operator of the vehicle with a safety barrier that does not restrict the operator's movements or impairs the operator's driving.

Other features and advantages of the present invention will become more apparent from the succeeding specification when considered in conjunction with the appended drawings in which.

Figure 1:
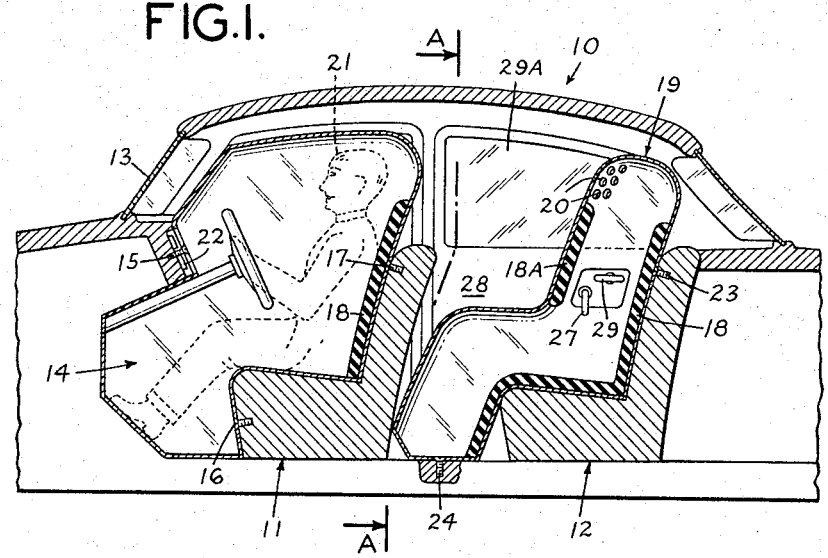
FIGURE 1 is a longitudinal vertical, sectional view through an automobile body with the operator therein and showing the operator's barrier and the passenger's barrier.

Referring now to the drawings and in particular to FIGURE 1, the reference numeral 10 indicates a passenger-carrying compartment of a vehicle, which in the present instance is the body of an automobile, having both a forward seat 11 and rear seat 12 therein. A rigid transparent plastic barrier 14 is mounted on seat 11 and held by attachments 15, 16, 17 to protect the operator 21. The barrier contains padding 18 for the operator's comfort and is constructed so as to protect the operator 21 from glass coming from windshield 13. The operator's barrier 14 is further constructed so as to allow access to controls 22.

The passenger barrier 19 may be mounted next to the operator's barrier 14 or as shown in FIGURE 1 attached to the rear seat 12 by attachments 23, 24. The barrier 19 is of a rigid transparent plastic material having ports 20 for air or communication. Padding 18 is to provide comfort for the occupant and padding 18A is to provide a cushioning means for the occupant's head during a collision.

Figure 2:
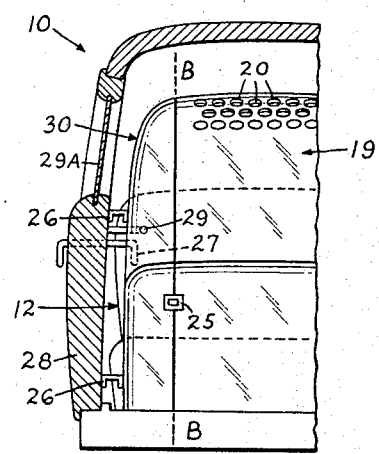
FIGURE 2 is a fragmentary sectional view of the passenger barrier taken along line A—A of FIGURE 1 showing the cooperation of the barrier entrance with an automobile door.

FIGURE 2 is a fragmentary section view of passenger barrier 9 taken along lines A—A. It shows one means of providing a door 30 for a barrier 9, 14. The barrier door 30 opens along line B—B and is mounted so as to cooperate with a car door 28 by means of mounts 26. An opening is provided in the barrier door 30 for access to the car door handle 27 and the means 29 for opening and closing the car window 29A.

A latch 25 may be added as an additional safety feature to help prevent the unintentional opening of the car door 28. Ports 20 may also be provided to permit air and communication with the persons outside of the barrier.

Figure 3:
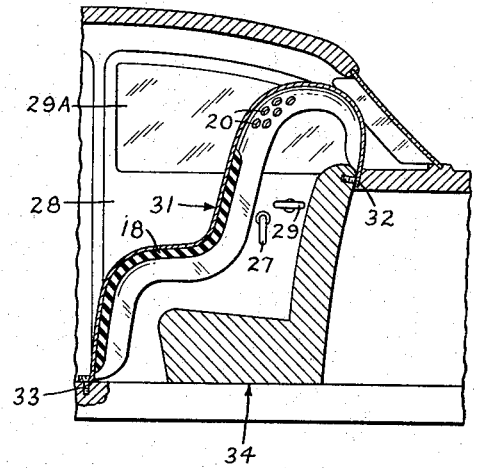
FIGURE 3 shows a further embodiment of the passenger barrier of this invention.

FIGURE 3 shows a barrier 31 that is mounted over a seat 34. The barrier 31 incorporates the seat 34 into a safety barrier by attachments 32 and 33. The barrier 31 uses as a cushion the seat 34 and padding 18. The barrier extends over the head of the occupant from behind to confront at least a major portion of the front of the occupant. The essential feature being the overhead construction and protection of the upper portion of the body. The feet may be exposed as it may be protected by the forward seat.

The barriers are of a transparent plastic material such as the tetrafluoroethylene resins, i.e. Teflon (a registered trademark of Du Pont); nitrocelluloses; polymerized acrylonitrile, polyvinyls, or the like, that can be easily laminated. The preferred plastic material is Teflon. The thickness of the barrier depends on material used and the type of vehicle receiving the barrier.

The barriers may be so constructed as to provide for one or more occupants. In an automobile the rear seat may be provided with single occupant barriers or a multi-occupancy barrier having doors on both sides. The front seat may include a single barrier for the operator and additional passengers or a separate barrier for the driver and the type shown for use on the rear seat of the automobile for the front seat passengers.

The provision of doors on the barrier is dependent upon the type of vehicle used and the degree of protection desired.

The barrier as shown in FIGURE 3 may be used incorporating the doors of the vehicle as well as the seat to form a complete barrier. In airplanes and trains where the greatest danger to the passenger is flying debris and the hurling of the passenger out of the seat, no doors may be needed.

It is seen therefore that the size and shape of the barrier is determined by the type of vehicle in which it is employed and the preference of the user.

The barriers may be rigidly mounted on the vehicle or they may be mounted so as to have yieldable cushioning means and rebound preventing means by the use of such as springs, telescoping cylinders, hydraulic cylinders, and the like. The yieldable means is to absorb the force of the momentum thrust of the occupant during a rapid deceleration and to prevent rebound of the occupant. For example, attachment 23 may be replaced by a spring (not shown) which may provide the yieldable movement of the barrier 19.

Although the invention has been described with reference to specific embodiments, materials and details, various modifications and changes, within the scope of this invention will be apparent to one skilled in the art, and are contemplated to be embraced within the invention.

I claim:

1. In a vehicle having a seat for at least one occupant in combination, a transparent plastic barrier mounted on said seat, said transparent plastic barrier being totally enclosed and having the shape of a seated occupant, padding disposed within said transparent plastic barrier on which the occupant sits, cushioning means disposed within the barrier, attachments for holding said transparent plastic barrier in a substantially vertical position on the seat, and at least one barrier door in said transparent plastic barrier permitting ingress and egress thereto.

2. In a vehicle according to claim 1 wherein said transparent plastic barrier is provided with a multiplicity of ports permitting air to circulate thereinto.

3. In a vehicle according to claim 2 wherein said barrier door is in communication with the door in the vehicle and is openable therewith.

4. In a vehicle according to claim 3 wherein said transparent plastic barrier is provided with a front wall, said cushioning means connected to said front wall to prevent injury to an occupant's head during a collision of the vehicle.

5. In a vehicle according to claim 3 wherein said transparent plastic barrier comprises tetrafluoroethylene.

References Cited
UNITED STATES PATENTS

| | | | |
|---|---|---|---|
| 2,025,822 | 12/1935 | Pryor | 280—150 |
| 2,726,054 | 12/1955 | Lesley et al. | 244—121 |
| 2,985,413 | 5/1961 | Widmanstetter | 244—122 |
| 3,095,170 | 6/1963 | Harb | 244—122 |

LEO FRIAGLIA, *Primary Examiner.*

BENJAMIN HERSH, *Examiner.*

L. D. MORRIS, *Assistant Examiner.*